United States Patent
Tsukamoto

(10) Patent No.: US 7,877,688 B2
(45) Date of Patent: Jan. 25, 2011

(54) DATA PROCESSING APPARATUS

(75) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 10/857,662

(22) Filed: May 27, 2004

(65) Prior Publication Data

US 2004/0255250 A1 Dec. 16, 2004

(51) Int. Cl.
*G06F 3/00* (2006.01)
(52) U.S. Cl. ............... 715/723; 715/724; 715/725
(58) Field of Classification Search .......... 715/723
See application file for complete search history.

(56) References Cited

U.S. PATENT DOCUMENTS

| | | | | |
|---|---|---|---|---|
| 5,829,046 | A * | 10/1998 | Tzelnic et al. | 711/162 |
| 5,930,446 | A * | 7/1999 | Kanda | 386/52 |
| 6,373,803 | B2 | 4/2002 | Ando et al. | |
| 6,400,378 | B1 * | 6/2002 | Snook | 715/716 |
| 6,628,303 | B1 * | 9/2003 | Foreman et al. | 715/723 |
| 6,710,785 | B1 * | 3/2004 | Asai et al. | 715/723 |
| 7,058,690 | B2 * | 6/2006 | Maehiro | 709/206 |
| 7,136,934 | B2 * | 11/2006 | Carter et al. | 709/248 |
| 7,206,892 | B2 * | 4/2007 | Kim et al. | 711/100 |
| 2002/0135608 | A1 * | 9/2002 | Hamada et al. | 345/723 |
| 2002/0145622 | A1 * | 10/2002 | Kauffman et al. | 345/723 |
| 2002/0150383 | A1 | 10/2002 | Kato | |
| 2003/0034997 | A1 * | 2/2003 | McKain et al. | 345/723 |
| 2003/0109710 | A1 * | 6/2003 | Hollingsworth et al. | 546/242 |
| 2003/0146915 | A1 * | 8/2003 | Brook et al. | 345/473 |
| 2003/0228134 | A1 * | 12/2003 | Kim et al. | 386/52 |
| 2004/0240852 | A1 | 12/2004 | Hori | |
| 2004/0255250 | A1 * | 12/2004 | Tsukamoto | 715/723 |
| 2005/0246641 | A1 * | 11/2005 | Hori et al. | 715/723 |
| 2005/0259957 | A1 * | 11/2005 | Jung et al. | 386/65 |
| 2006/0026634 | A1 * | 2/2006 | LaChapelle et al. | 725/34 |

FOREIGN PATENT DOCUMENTS

| | | |
|---|---|---|
| CN | 1149924 | 5/1997 |
| CN | 1222814 | 7/1999 |
| JP | 10-003778 | 1/1998 |
| JP | 10-234007 | 9/1998 |
| JP | 2000-187606 | 7/2000 |
| JP | 2002-191026 | 7/2002 |
| JP | 2002-369164 | 12/2002 |
| JP | 2004-355705 | 12/2004 |

OTHER PUBLICATIONS

NPL Reference U: Cowart, Robert et al. "Special Edition Using Microsoft Windows XP Professional." Copyright Dec 4, 2001.*

* cited by examiner

*Primary Examiner*—Doug Hutton
*Assistant Examiner*—Soumya Dasgupta
(74) *Attorney, Agent, or Firm*—Canon U.S.A., Inc., IP Division

(57) ABSTRACT

A data processing apparatus generating deletion-data management information indicating a deleted portion of moving image data recorded on a recording medium, in response to an instruction to delete the portion of the moving-image data. The deletion-data management information includes a deleted item corresponding to the deleted portion of the moving image data.

7 Claims, 10 Drawing Sheets

DATA PROCESSING APPARATUS

BACKGROUND OF THE INVENTION

1. Field of the Invention

The present invention relates to a data processing apparatus, and more particularly to a process for deleting moving image data from a recording medium.

2. Description of the Related Art

Recently, a number of apparatuses for recording an AV (audiovisual) signal, such as a video signal, or the like, on a disk-type information recording medium has been proposed.

In apparatuses of this type, as described in Japanese Patent Application Laid-Open (Kokai) No. 2002-157859 (corresponding US application No.: AA2002150383), information relating to management of data recorded on a recording medium is recorded in the form of a file. The data recorded on the recording medium and reproduced information are appropriately managed.

An application format for appropriately managing the data and the reproduced information on an information recording medium will now be described. This format has two layers, i.e., PlayList and Clip, for managing AV streams. FIG. 1 is a diagram illustrating the relationship between Clips and PlayLists. Volume Information manages all Clips and PlayLists on a disk. An AV stream and its attribute information are considered as one object, or "Clip." An AV stream file is called a "Clip AV stream file," and attribute information thereof is called a "Clip Information file."

A Clip AV stream file stores data in which an MPEG2 transport stream is arranged in a structure provided by a DVR (digital video recording) application format. In general, a data file used in a computer, or the like is dealt with as a byte string. The contents of a Clip AV stream file are developed on the time base, and PlayList assigns an access point in a Clip mainly with a time stamp. When the time stamp of an access point in a Clip is given, a Clip Information file is useful for finding information relating to an address (a data-byte position) where decoding of a stream is to be started in the Clip AV stream file. PlayList is introduced for allowing selection of a reproduction section desired by the user to see in a Clip, and for easy editing of the reproduction section.

A PlayList is a set of reproduction sections in a Clip. A reproduction section in a Clip is called a "PlayItem," which is represented by a pair of IN point and OUT point. Accordingly, a PlayList is a set of PlayItems. PlayList has two types, i.e., Real PlayList and Virtual PlayList.

A Real PlayList is considered to share a stream portion of a Clip referred to by the Real PlayList. That is, a Real PlayList occupies a data capacity corresponding to a stream portion of the referred Clip in a disk. A PlayItem of a Real PlayList does not assign an overlapped reproduction section of one Clip AV stream. When an AV stream is recorded as a new Clip, a Real PlayList that refers to a reproducible range of entirety of the Clip is automatically formed.

Next, a case in which part of an AV stream is deleted will be described with reference to FIG. 2. As shown in a left portion of FIG. 2, Real PlayList 1 before partial deletion is configured by PlayItem 1 that is considered to assign entirety of Clip 1. When an intermediate portion of Real PlayList 1 is deleted as a result of partial deletion of the AV stream, then, as shown in a right portion of FIG. 2, Real PlayList 2 after partial deletion is configured by two PlayItems, i.e., PlayItem 2 and PlayItem 3, in which PlayItem 2 indicates a Clip before a deleted Clip on the time base, and PlayItem 3 indicates a Clip after the deleted Clip on the time base.

Data of a stream portion subjected to partial deletion is erased from the disk. The Clip after partial deletion is present on the disk as one file. When Real PlayList 2 after partial deletion is reproduced, Clip 3 is reproduced consecutively from Clip 2.

Even if a Virtual PlayList is changed or erased, no change occurs in a Clip.

As described above, in the conventional proposal, when part of an AV stream is erroneously erased, there is no means for restoring the erased portion.

Another problem is that, even when erasure of a plurality of portions in one AV stream is intended, much time and troublesome operations are required because confirmation of partial deletion of a Real PlayList and deletion of stream data of a clip referred to by the Real PlayList from the disk are repeated.

SUMMARY OF THE INVENTION

The present invention has been made in consideration of the above-described problems.

The present invention allows for every restoration of erroneously partially erased moving-image data string recorded on an information recording medium.

According to one aspect of the present invention, a data processing apparatus includes deletion instruction means for instructing partial deletion of moving-image data recorded on a recording medium, and management-information processing means for generating deletion-data management information indicating a deleted portion of the moving-image data in response to an instruction from the deletion instruction means. The deleted-data management information includes a plurality of deleted items corresponding to a plurality of deleted portions of the moving image data.

The present invention also allows, when intending to delete part of one moving image data string, viewing of entirety of partially deleted stream portions without confirming a deletion portion at every deleting operation, and deleting entirety of the partially deleted stream portions from a disk at a time.

The foregoing advantages and features of the present invention will become more apparent from the following detailed description of the embodiments taken in conjunction with the accompanying drawings.

DETAILED DESCRIPTION OF THE PREFERRED EMBODIMENTS

An embodiment of the present invention will now be described with reference to the drawings.

Figure 1:
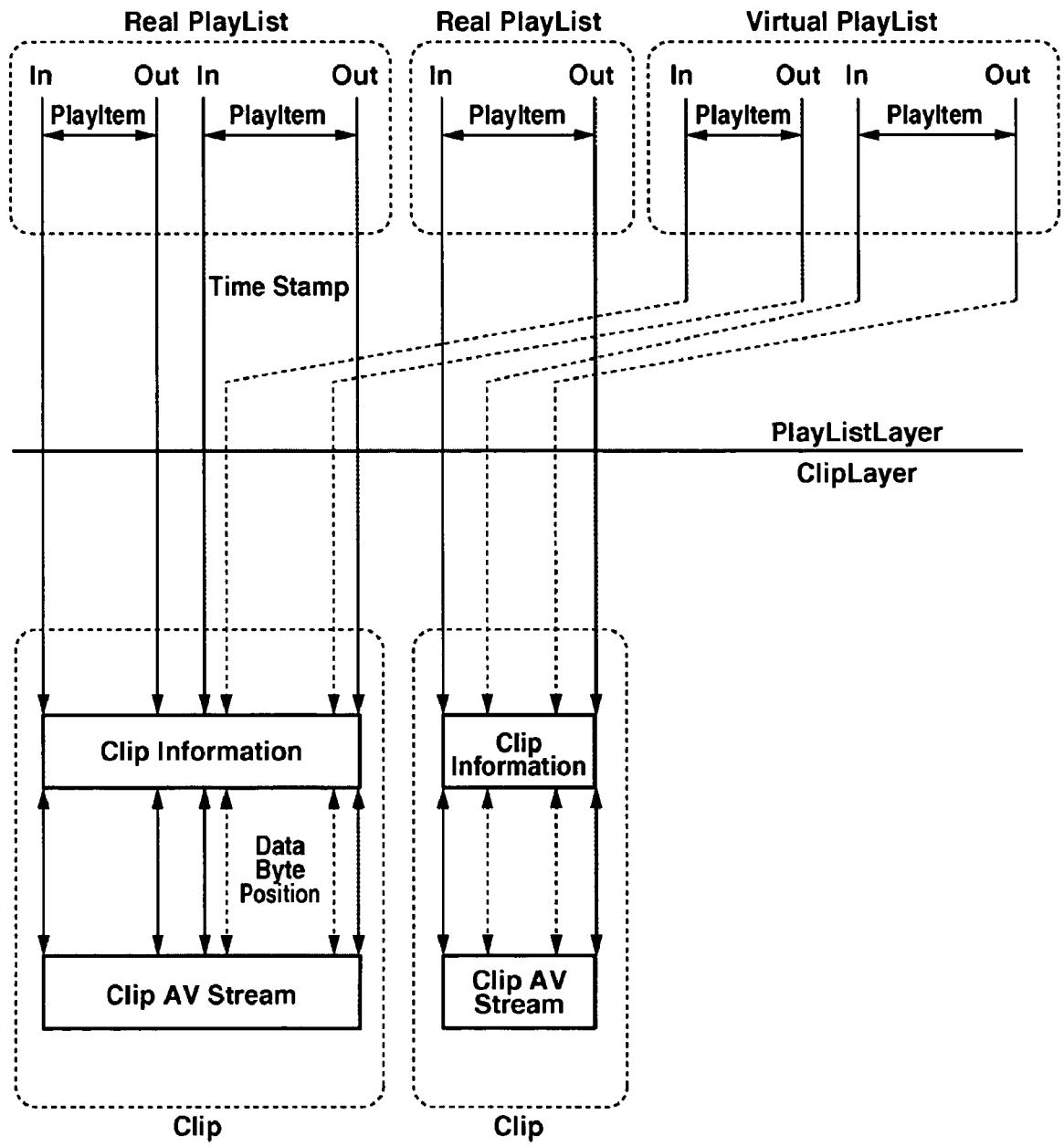
FIG. 1 is a diagram illustrating the relationship between Clips and PlayLists.
Figure 2:
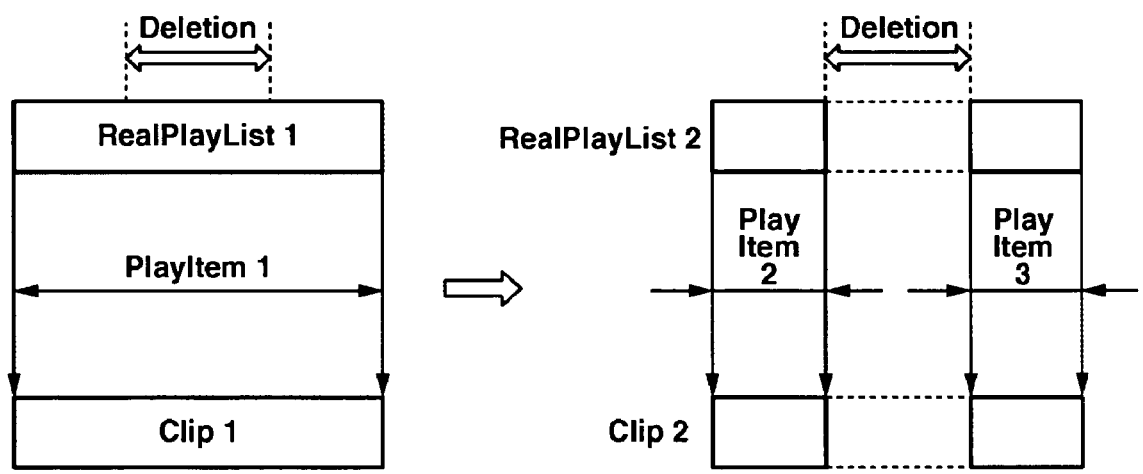
FIG. 2 is a diagram illustrating a conventional PlayList rewriting operation in a deletion process.
Figure 3:
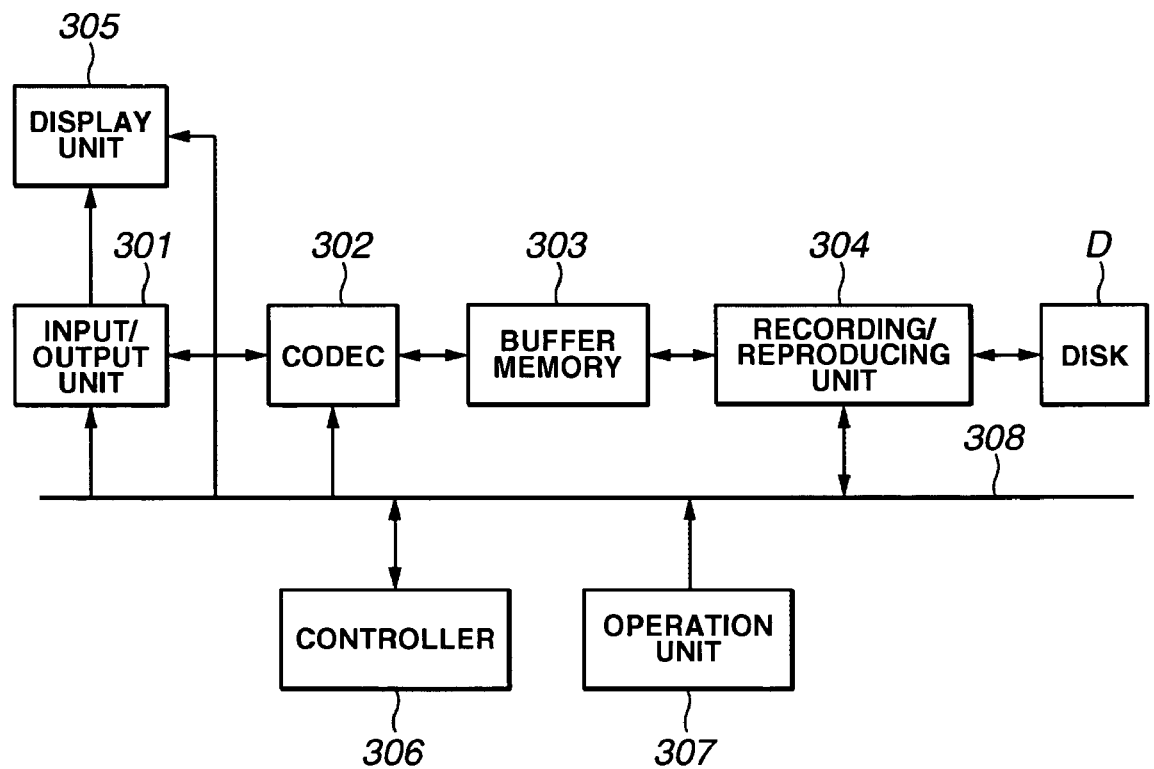
FIG. 3 is a diagram illustrating the configuration of a recording/reproducing apparatus to which the present invention is applied.

FIG. 3 is a block diagram illustrating an information recording/reproducing apparatus to which the present invention is applied.

In FIG. 3, an input/output unit 301 inputs moving-image data and voice data, which are encoded by a CODEC 302 according to an MPEG2 method. The CODEC 302 outputs the resultant multiplexed data to a buffer memory 303. A recording/reproducing unit 304 reads an encoded data string from the buffer memory 303 at a predetermined timing, and records the read encoded data string on a disk D. The recording/reproducing unit 304 also records files including various types of play-list information for processing by a controller 306 (as will be described below), on the disk D.

In a reproducing operation, the recording/reproducing unit 304 reproduces a Real PlayList file, serving as management data, from the disk D, and outputs the reproduced data to the controller 306. The controller 306 controls reproduction of data from the disk D based on the Real PlayList file.

Encoded data reproduced by the recording/reproducing unit 304 is output to the CODEC 302 via the buffer memory 303. The CODEC 302 decodes the reproduced decoded data, and outputs the decoded data to the input/output unit 301 as moving image data and voice data. The input/output unit 301 outputs the moving image data and the voice data to an apparatus external to this information recording/reproducing apparatus.

A display unit 305 displays an image corresponding to the input moving image data in a recording operation, and displays an image corresponding to the moving image data output from the CODEC 302 in a reproducing operation.

The controller 306 controls respective units via a bus 308 in accordance with instructions from an operation unit 307. Further, the controller 306 generates various types of information for performing display on the display unit 305. The controller 306 also processes Real PlayList and Virtual PlayList that will be described below.

When the user intends to reproduce data recorded on the disk D based on play list data, the controller 306 controls the recording/reproducing unit 304 to reproduce a file of Virtual PlayList data recorded on the disk D, and stores the reproduced file in an internal memory. Then, the controller 306 generates summary information of the Virtual PlayList data, and displays the generated summary information on the display unit 305.

The user selects PlayList data to be reproduced from the above-described summary information of the Virtual PlayList data via the operation unit 307. The controller 306 controls the recording/reproducing unit 304 so as to reproduce data from the disk D according to a procedure instructed by PlayList, based on assigned PlayList data.

Next, a process of partially deleting an AV stream recorded on the disk D will be described.

Upon selection of an AV stream file to be partially deleted via the operation unit 307, and designation of partial deletion processing, the controller 306 controls the recording/reproducing unit 304 to start reproduction of the assigned AV stream file and to read the Real PlayList data of the assigned AV stream file. The recording/reproducing unit 304 writes the reproduced AV stream in the buffer memory 303, and outputs the Real PlayList data to the controller 306.

The reproduced AV stream data is decoded in the same manner as in an ordinary reproducing operation. A reproduced moving image is displayed on the display unit 305.

The user assigns IN point (a start position) and OUT point (an end position) of a section for partial deletion via the operation unit 307, while watching the reproduced image displayed on the display unit 305. The controller 306 changes the contents of the Real PlayList data of this AV stream file based on this instruction of partial deletion, and generates a deletion data PlayList that refers only to the deleted portion.

Figure 4:
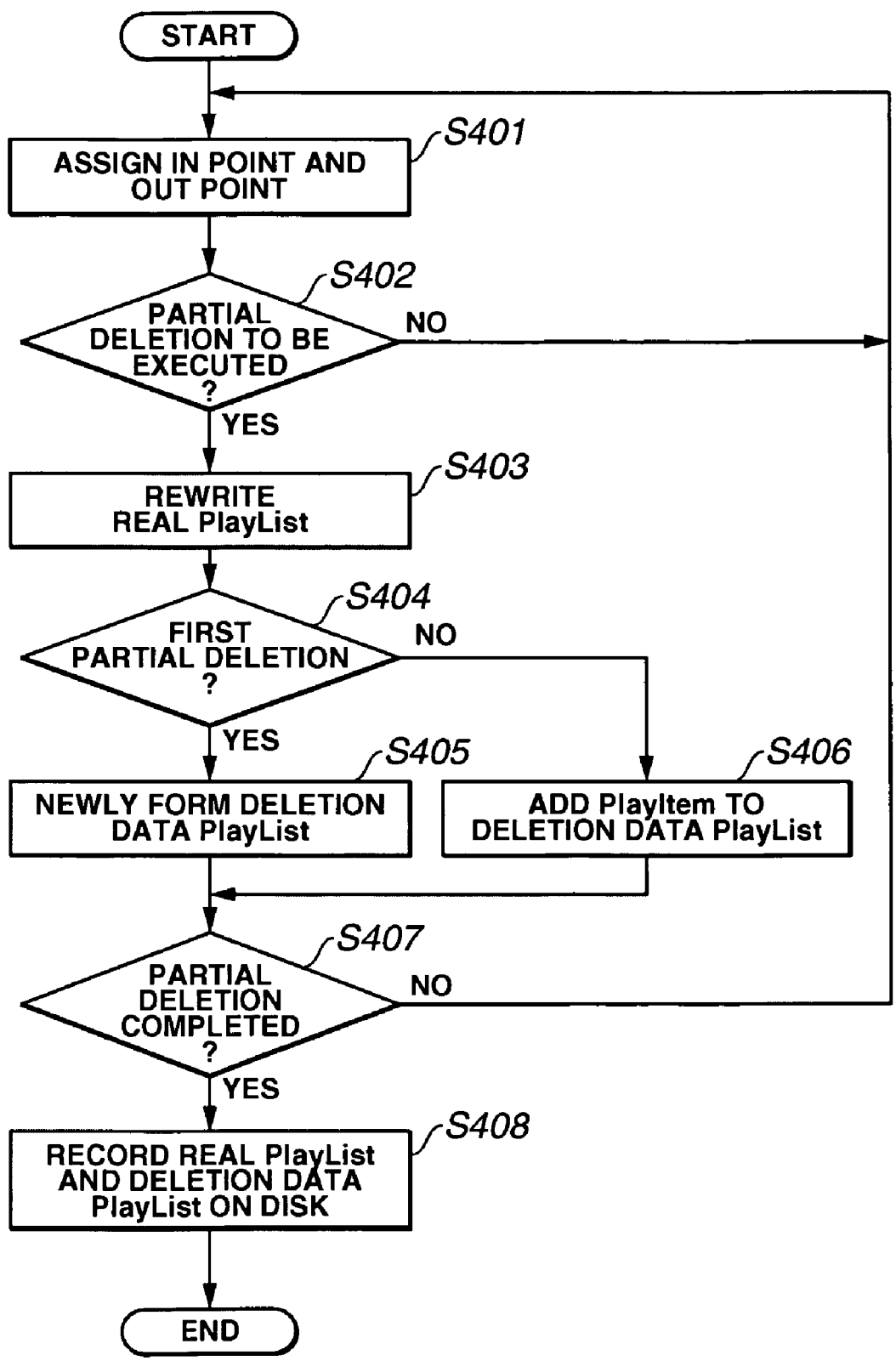
FIG. 4 is a flowchart illustrating a partial deletion process.

FIG. 4 is a flowchart illustrating control by the controller 306 in a partial deletion process.

When an AV stream to be partially deleted has been assigned and reproduced, the start (IN point) and the end (OUT point) of the section to be deleted is assigned via the operation unit 307 (step S401). Then, a query is made on whether partial deletion should be executed (i.e., whether or not the section assigned for partial deletion should be deleted) (step S402). If partial deletion is cancelled (NO in step S402), then the setting of the assigned IN point and OUT point is invalidated, and the process returns to step S401.

If partial deletion is to be executed (YES in step S402), the process proceeds to step S403. The controller 306 divides the Real PlayList into two PlayItems and rewrites the Real PlayList so as to indicate a Clip before the deleted portion on the time base, and a Clip after the deleted portion on the time base (step S403).

In step S404, a determination is made whether or not this partial deletion is a first instruction of partial deletion for this AV stream. If YES, deletion data PlayList is formed, with the partial deletion section (the portion between the IN point and the OUT point) assigned as a PlayItem (step S405). The deletion data Play List is a Real PlayList configured by a set of PlayItems, serving as partial deletion sections. The deletion data PlayList has attributes different from attributes of an ordinary Real PlayList, allowing the deletion data PlayList to be distinguished from the ordinaly Real PlayList. A deletion data PlayList is formed for each AV stream file.

If this partial deletion is not a first instruction for this AV stream (NO in step S404), the partial deletion section is added to a deletion data PlayList of this AV stream file as a new PlayItem (step S406). At that time, by simultaneously forming an index point, serving as mark information for referring to an arbitrary scene, it is possible to preview an image for each partial deletion at a high speed.

Then, a determination is made whether or not the partial deletion process is complete (step S407). If NO, the process returns to step S401. Otherwise, the Real PlayList data and the deletion data PlayList data are recorded on the disk D via the recording/reproducing unit 304. At that time, one deletion data PlayList is recorded as one file.

Figure 5:
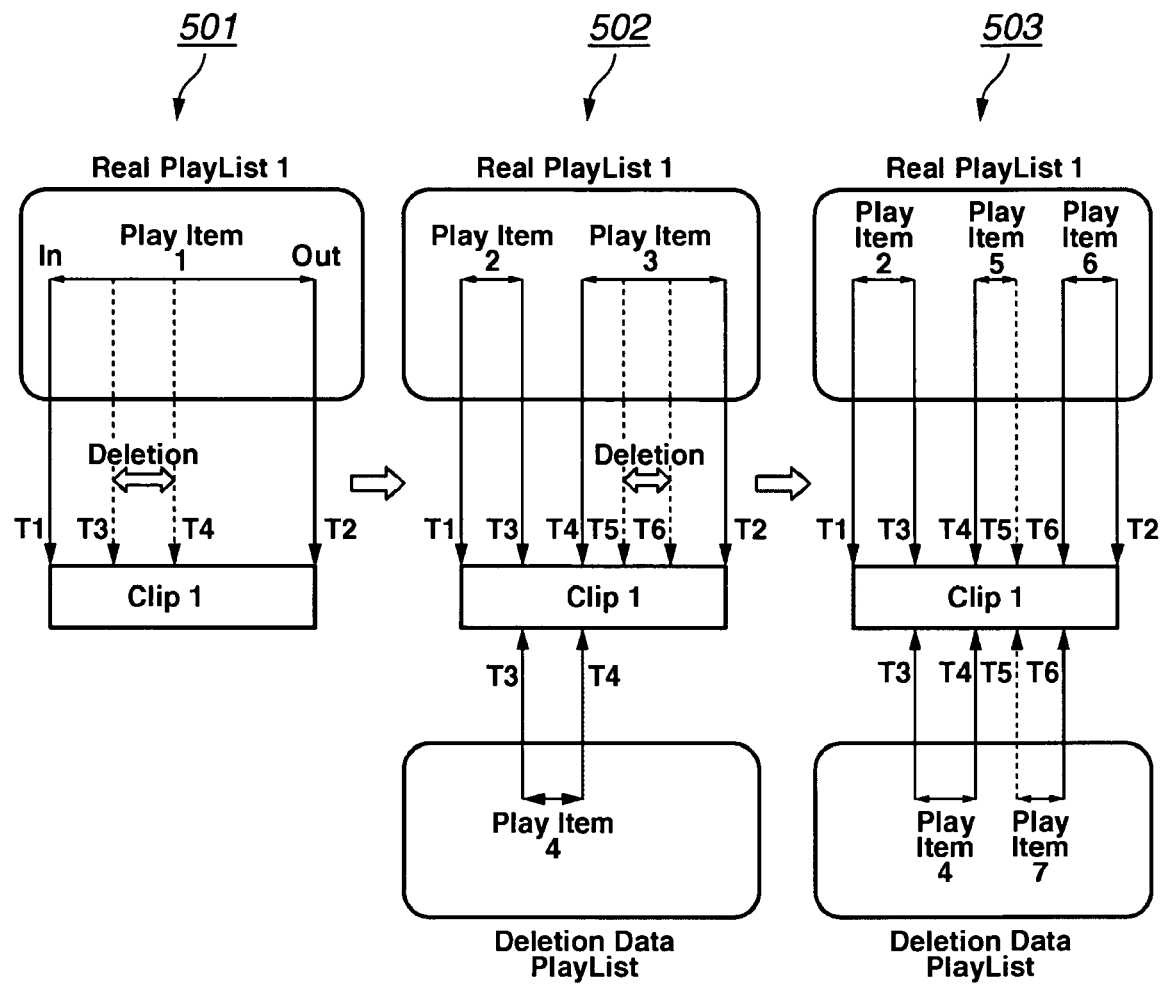
FIG. 5 is a diagram illustrating the behavior of Real PlayList and detection data PlayList in a partial deletion process.

FIG. 5 is a diagram illustrating the behavior of a Real PlayList and a deletion data PlayList in partial deletion of an AV stream.

In a state 501 before execution of partial deletion, a Real PlayList 1 is configured by one PlayItem 1. A clip corresponding to the PlayItem 1 is Clip 1, and a reproduction section is T1-T2. When data between reproduction sections T3 and T4 is subjected to partial deletion, then, as shown in a state 502, the contents of the Real PlayList 1 are changed so as to have two PlayItems, i.e., a PlayItem 2 and a PlayItem 3. The PlayItem 2 has a corresponding clip of Clip 1 and a reproduction section of T1-T3. The PlayItem 3 has a corresponding clip of Clip 1 and a reproduction section of T4-T2.

Furthermore, newly formed is a deletion data PlayList having a PlayItem 4. The PlayItem 4 has a corresponding clip of Clip 1 and a reproduction section of T3-T4.

When data of a reproduction section of T5-T6 is subjected to partial deletion, then, as shown in a state 503, the contents of the Real PlayList 1 are changed so as to be configured by the PlayItem 2 having a corresponding clip of Clip 1 and a reproduction section of T1-T3, a PlayItem 5 having a corresponding clip of Clip 1 and a reproduction section of T4-T5, and a PlayItem 6 having a corresponding clip of Clip 1 and a reproduction section of T6-T2.

In addition, a PlayItem 7 having a corresponding clip of Clip 1 and a reproduction section of T5-T6 is newly added to the deletion data PlayList. As described above, every time partial deletion is completed, a PlayItem indicating the deleted portion is newly added to the deletion data PlayList.

In this embodiment, a recording region assigned by this deletion data PlayList is not dealt with as a vacant region. When the remaining available recording space on the disk D becomes small and the recording region assigned to the deletion data PlayList is to be used for recording new data, then, after displaying on the display unit 305 a warning indicating that this region is assigned by the deletion data PlayList for recording new data and cannot be restored if overwrite is performed on this region, an editing/restoring process of deletion data is executed.

Next, the editing/restoring processing using the deletion data PlayList formed in the above-described manner will be described with reference to the flowchart shown in FIG. 6.

When a process for editing deletion data for a file selected from among AV stream files recorded on the disk D is initiated via the operation unit 307, the controller 306 instructs the recording/reproducing unit 304 to reproduce Real PlayList data and deletion data PlayList of this AV stream file. After storing the Real PlayList data and the deletion data PlayList in an internal memory, the flow of FIG. 6 is started.

First, an edition menu using the deletion data PlayList is displayed on the display unit 305. The user selects a desired process from the edition menu via the operation unit 307 (step S601).

If the selected process is a preview process (YES in step S602), the recording/reproducing unit 304 is controlled so as to reproduce AV stream data in accordance with the deletion data PlayList (step S607). The user can thereby confirm data previously subjected to partial deletion from the currently selected AV stream.

If the selected process is a deletion process (YES in step S603), the recording/reproducing unit 304 is controlled so as to delete the deletion data PlayList from the disk D (step S608). By thus deleting the deletion data PlayList from the disk D, it is possible to delete all data previously subjected to partial deletion from the AV file at a time. When the deletion data PlayList is deleted, the deletion data can no longer be restored. Accordingly, a warning indicating that restoration cannot be performed if this deletion data PlayList is deleted may be displayed on the display unit 305.

If a partial restoration process is selected (YES in step S604), a message indicating that a section to be restored is assigned is displayed on the display unit 305. The user assigns the section to be restored via the operation unit 307 (step S609). At that time, it is possible to perform restoration in units of a PlayItem of deletion data PlayList shown in FIG. 5. Then, the process proceeds to PlayList changing processing in step S611.

If an entire restoration process is selected (YES in step S605), all PlayItems of deletion data PlayList are assigned sections to be restored (step S610). Then, the process proceeds to step S611.

When end of the deletion-data editing processing is instructed, all processing is terminated (step S606).

Next, the PlayList changing process in step S611 shown in FIG. 6 will be described with respect to the flowchart shown in FIG. 7.

Figure 7:
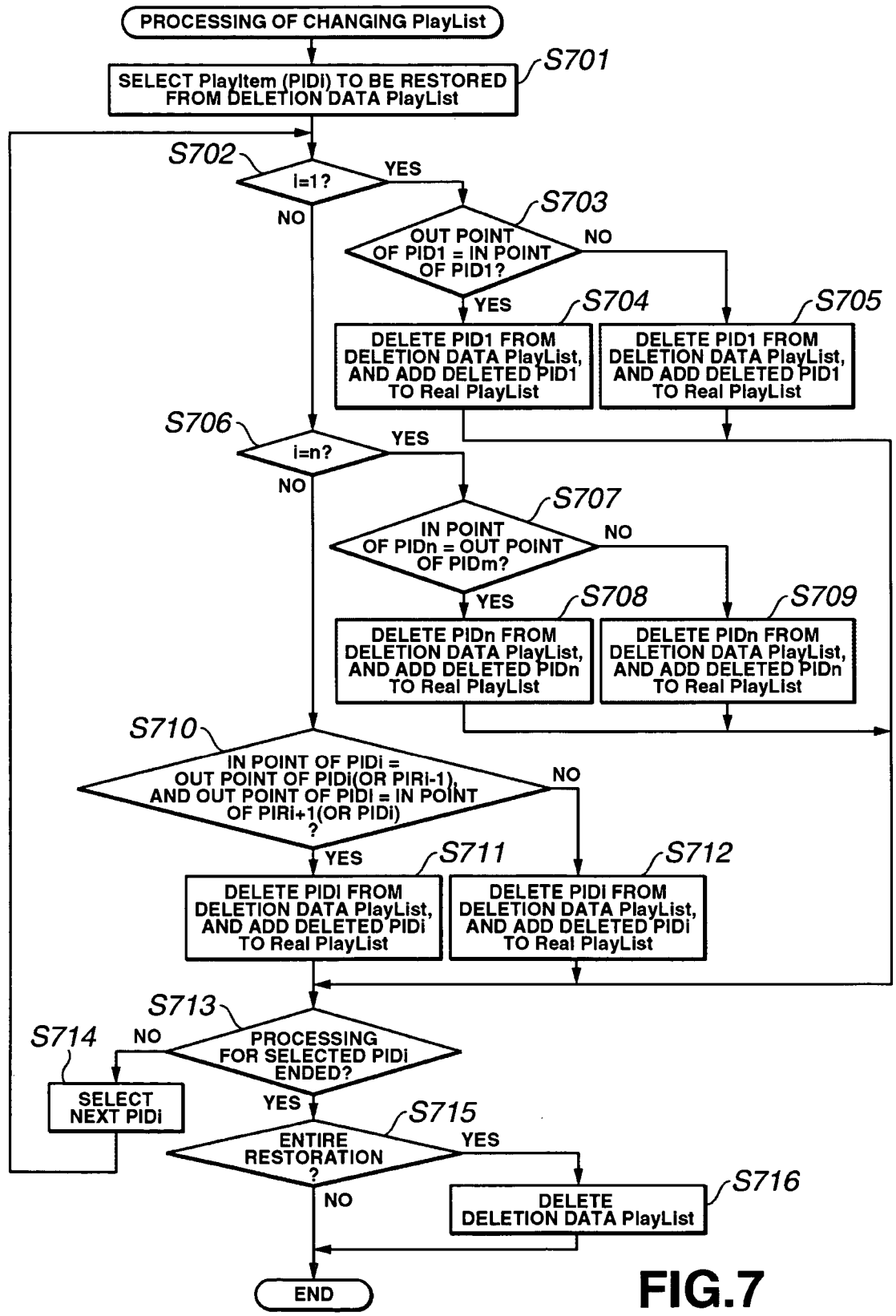
FIG. 7 is a flowchart illustrating a process of changing PlayList.

In FIG. 7, PlayItem of Real PlayList is set to PIRi (i=1−m), and PlayItem of deletion data PlayList is set to PIDi (i=1−n). In FIG. 7, "i" represents the order of reproduction at each PlayList.

Figure 6:
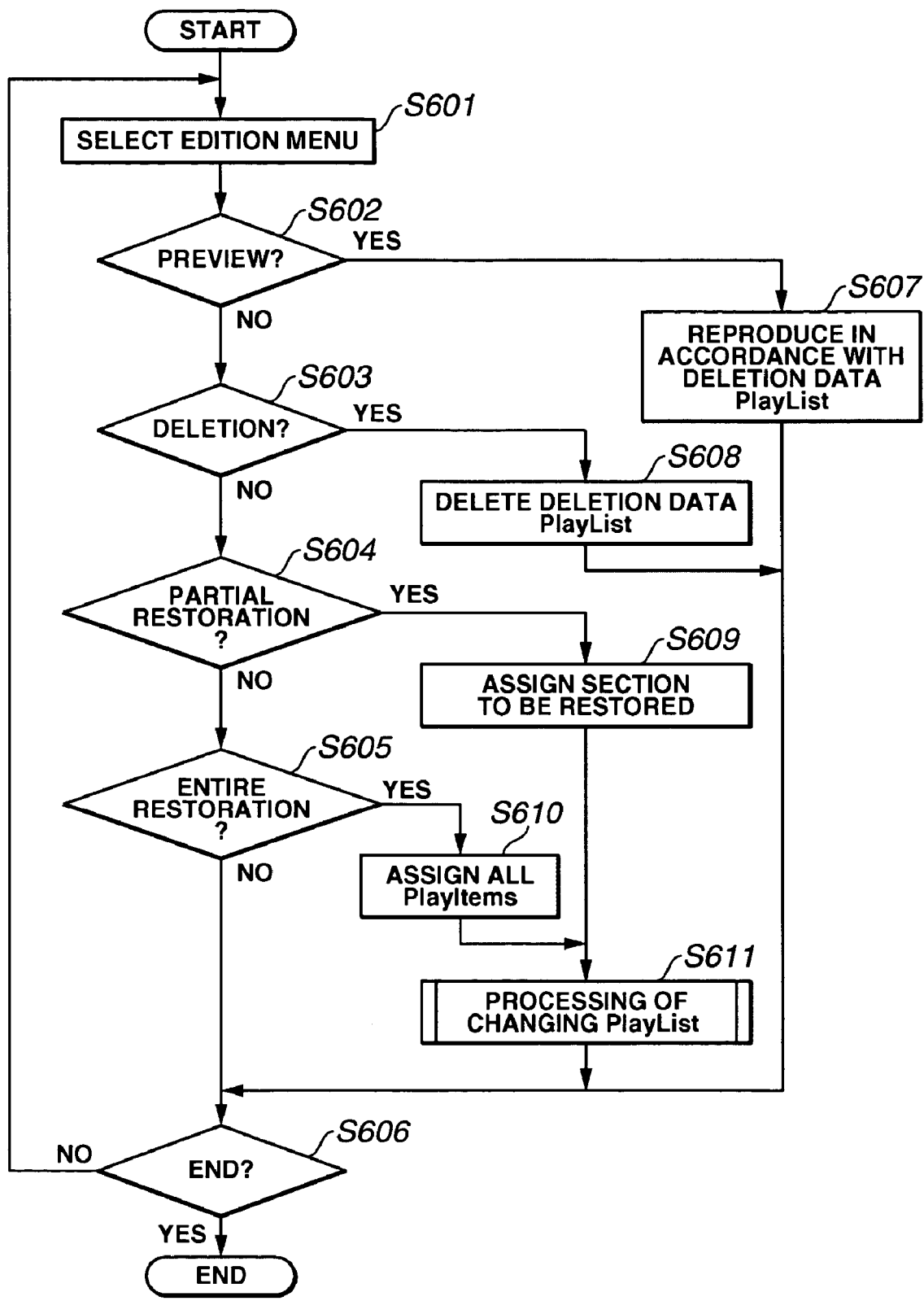
FIG. 6 is a flowchart illustrating a process of editing deletion data PlayList.

First, the PlayItem (PIDi) to be restored in response to the instruction in step S609 or S610 shown in FIG. 6 is selected from among PlayItems of deletion data PlayList (step S701). That is, when partial restoration is to be performed in step S609, the PlayItem of the section assigned in step S609 is selected, and when entire restoration is to be performed in step S610, all PlayItems of the deletion data PlayList are selected.

Processing is performed for all PIDi's selected in the above-described manner.

First, it is determined whether or not "i" is 1, i.e., the selected PID includes the leading position of the original clip (step S702). If the result of the determination in step S702 is affirmative, then, it is determined whether or not OUT point of this PID1 is PIR1, i.e., equals IN point of the first PlayItem of Real PlayList (step S703). If the result of the determination in step S703 is affirmative, the PID1 is deleted from deletion data PlayList, and is inserted at a point before PIR1 in Real PlayList (step S704).

If NO in step S703, then the contents differ between Real PlayList and deletion data PlayList by some reason, and the PID1 is deleted from deletion data PlayList and the deleted PID1 is added at the last position of Real PlayList (step S705).

If the determination is NO in step S702, then it is determined whether or not "i" is n, i.e., the selected PID includes the last portion of the original clip (step S706). If YES in step S706, then it is determined whether or not IN point of this PIDn equals PIRm, i.e., equals OUT point of the last PlayItem of Real PlayList (step S707). If YES in step S707, the PIDn is deleted from the deletion data PlayItem and inserted at a point after PIRm of the Real PlayList (step S708).

If NO in step S706, then the contents differ between Real PlayList and deletion data PlayList by some reason, and the PIDn is deleted from the deletion data PlayList and added at the last position of Real PlayList (step S709).

When "i" is neither 1 or n, it is considered that the PlayItem is deleted from a midpoint of the clip. Then, it is determined whether or not IN point of the PIDi equals OUT point of PIRi (or PIRi−1), and whether or not OUT point of the PIDi equals IN point of PIRi+1 (or PIRi) (step S710). In step S710, IN point of PIDi is compared with OUT point of PIRi, or OUT point of PIRi−1, because the value of "i" at each PlayItem of Real PlayList in this flow changes depending on whether or not the leading portion of the original clip is deleted.

If YES in step S710, the PIDi is deleted from deletion data PlayList and inserted between PIRi (PIRi−1) an PIRi+1 (PIRi). Further, restoration is performed so that reproduction is performed in the order of PIRi, PIDi and PIRi+1, i.e., in the same order of reproduction before partial deletion is not performed.

If NO in step S710, then the contents differ between Real PlayList and deletion data PlayList by some reason, and the PIDn is deleted from the deletion data PlayList and added at the last position of Real PlayList (step S712).

Then, it is determined whether or not processing for all PIDi's selected in step S701 has been completed (step S713). If NO in step S713, then the next PIDi is selected and the process returns to step S702 (step S714).

When processing has been completed for all PIDi's (YES in step S713), then it is determined whether or not the current process is an entire restoration process selected in step S610 (step S715). If YES in step S715, the deletion data PlayList of this AV stream file is deleted from the disk D, and the processing is terminated (step S716).

Figure 8:
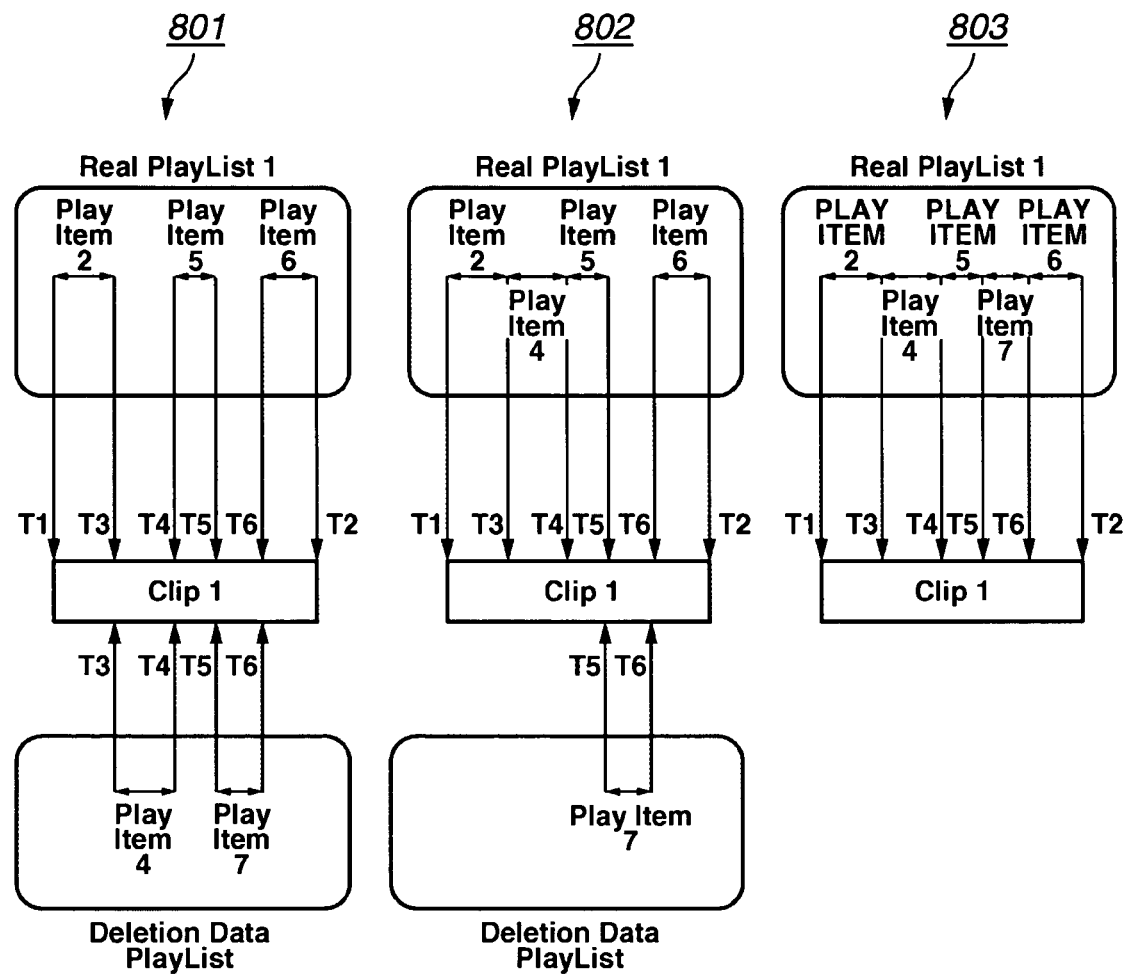
FIG. 8 is a diagram illustrating the behavior of Real PlayList and deletion data PlayList in a restoration process.

FIG. 8 is a diagram illustrating the behavior of Real PlayList and deletion data PlayList in the above-described partial restoration or restoration processing.

As described with reference to FIG. 5, the deletion data PlayList shown in FIG. 8 is a deletion data PlayList formed in a partial deletion processing. The deletion data PlayList is configured by two PlayItems, i.e., a PlayItem 4 having a corresponding clip of Clip 1 and a reproduction section of T3-T4 (IN point=T3, and OUT point=T4), and a PlayItem 7 having a corresponding clip of Clip 1 and a reproduction section of T5-T6 (IN point=T5, and OUT point=T6). The Real PlayList 1 after partial deletion is configured by three PlayItems, i.e., a PlayItem 2 having a corresponding clip of Clip 1, and a reproduction section of T1-T3 (IN point=T1, and OUT point=T3), PlayItem 5 having a corresponding clip of Clip 1 and a reproduction section of T4-T5 (IN point=T4, and OUT point=T5), and PlayItem 6 having a corresponding clip of Clip 1 and a reproduction section of T6-T2 (IN point=T6, and OUT point=T2).

When restoring the PlayItem 4 of the deletion data PlayList, as indicated in a state 801, the OUT point of PlayItem 2 and the IN point of PlayItem 4 are both T3, and the OUT point of PlayItem 5 and the IN point of PlayItem 4 are both T4. Accordingly, as indicated in a state 802, the PlayItem 4 is deleted from the deletion data PlayList, and the deleted PlayItem 4 is inserted between the PlayItem 2 and the PlayItem 5 of the Real PlayList 1.

Similarly, when restoring the PlayItem 7, the OUT point of the PlayItem 5 and the IN point of the PlayItem 7 are both T5, and the OUT point of the PlayItem 7 and the IN point of the PlayItem 6 are both T6. Accordingly, as indicated in a state 803, the PlayItem 7 is deleted from the deletion data PlayList, and the deleted PlayItem 7 is inserted between the PlayItem 5 and the PlayItem 6 of the Real PlayList 1. The Real PlayList 1 is thereby restored to the same reproduction state as before deletion. The deletion data PlayList is deleted because all PlayItems have been deleted.

Figure 9:
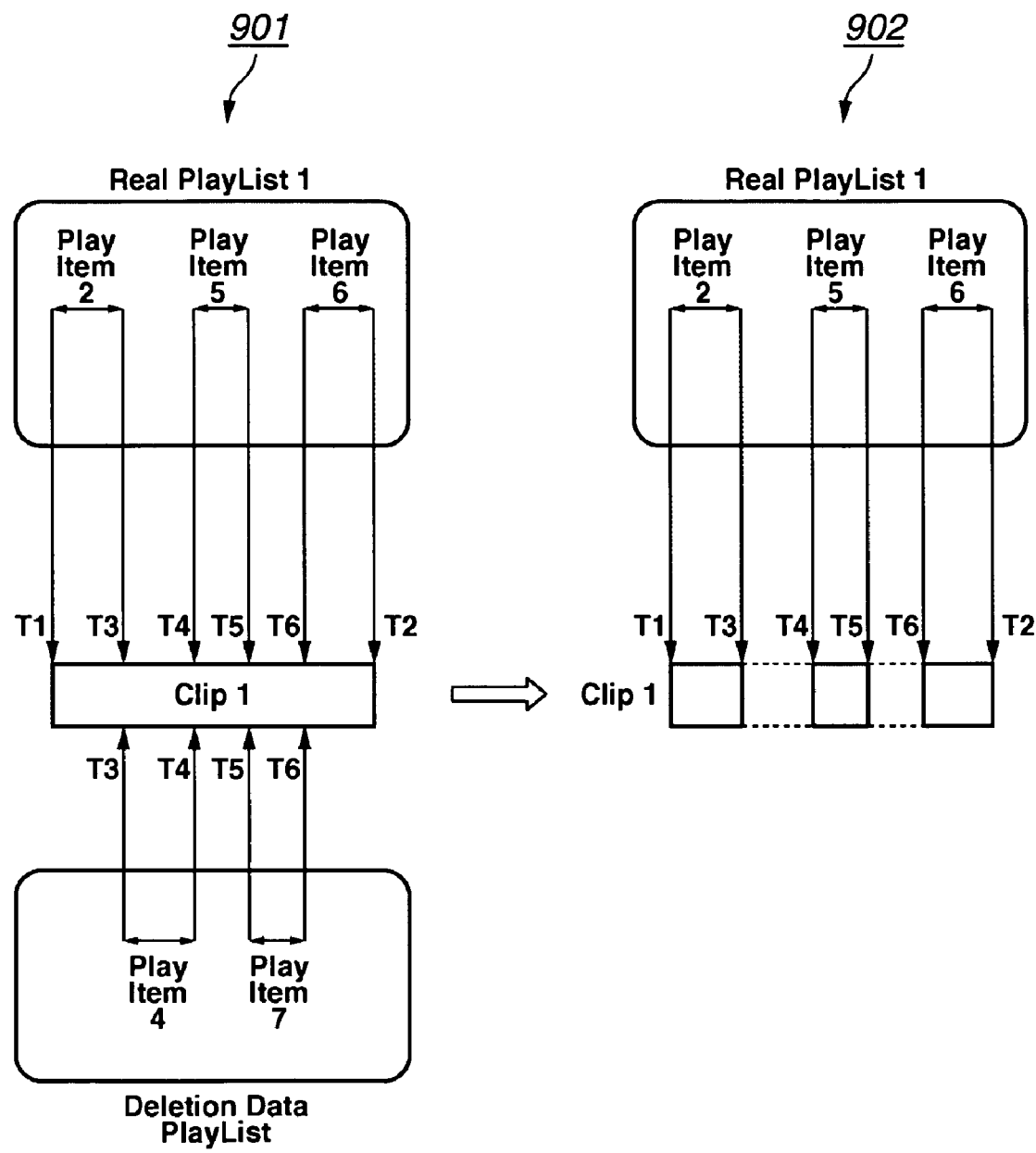
FIG. 9 is a diagram illustrating the behavior of Real PlayList and deletion data PlayList in a deletion process.

FIG. 9 is a diagram illustrating the behavior of a Real PlayList and a deletion data PlayList when a deletion process is executed in FIG. 6.

As described with reference to FIG. 5, the deletion data PlayList shown in FIG. 9 is a deletion data PlayList formed in a partial deletion processing. The deletion data PlayList is configured by two PlayItems, i.e., a PlayItem 4 having a corresponding clip of Clip 1 and a reproduction section of T3-T4 (IN point=T3, and OUT point=T4), and a PlayItem 7 having a corresponding clip of Clip 1 and a reproduction section of T5-T6 (IN point=T5, and OUT point=T6). When the deletion data PlayList is deleted, Clip AV stream data region of a portion corresponding to the PlayItem 4 and the PlayItem 7 in Clip 1, i.e., the reproduction section T3-T4 of Clip 1 and the reproduction section T5-T6 of Clip 1, becomes a vacant region.

As described above, according to this embodiment, when parts of the AV stream data are deleted, a deletion data PlayList referring to only the deleted portion is formed for each AV stream file. Hence, the user can later confirm a portion subjected to deletion processing.

Furthermore, by rewriting Real PlayList based on this deletion data PlayList, it is possible to restore data that has been erroneously deleted.

Furthermore, by deleting this deletion data PlayList, it is possible to delete a plurality of deletion data at a time.

Although in the above-described embodiment, deletion data PlayList is formed for each AV stream file, it is also possible to form a deletion summary PlayList file in which deleted portions of all AV stream files are summarized in one PlayList, and the process shown in FIG. 6 can be executed using this deletion summary PlayList.

Figure 10:
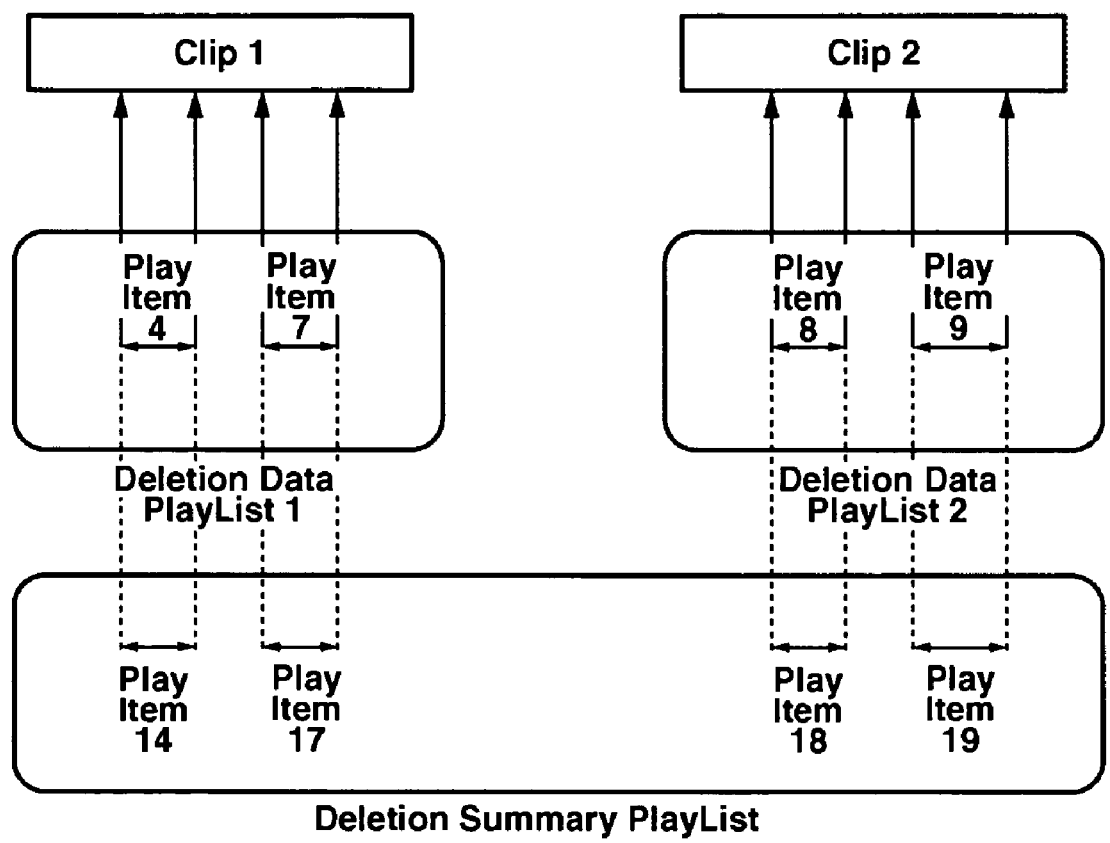
FIG. 10 is a diagram illustrating the behavior of deletion summary PlayList.

FIG. 10 is a diagram illustrating the behavior of a deletion summary PlayList formed in the above-described manner.

First, as shown in FIG. 10, a deletion data PlayList 1 is formed in a partial deletion process for Clip 1. Then, a deletion summary PlayList having two PlayItems, i.e., a PlayItem 14 corresponding to a PlayItem 4 of the deletion data PlayList 1, and a PlayItem 17 corresponding to a PlayItem 7 of the deletion data PlayList 1, is formed.

Then, a deletion data PlayList 2 having two PlayItems, i.e., a PlayItem 8 and a PlayItem 9, in which partial deletion for Clip 2 has been completed. Two PlayItems, i.e., a PlayItem 18 corresponding to a PlayItem 8 and a PlayItem 19 corresponding to a PlayItem 9, are newly added to the deletion summary PlayList.

As described above, every time deletion data PlayList is newly formed, a PlayItem is newly added to the deletion summary PlayList.

The individual components designated by blocks in the drawings are all well known in the data processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for processing image data comprising:

recording AV stream data of one clip and a first play list designating a region to be reproduced of the AV stream data in the one clip;

designating a first portion and a second portion different from the first portion of the AV stream data in the one clip recorded on the recording medium;

generating a second play list indicating the first portion and the second portion in the one clip;

changing the first play list so as to designate the AV stream data other than the first portion and the second portion in the one clip;

reproducing the AV stream data other than the first portion and the second portion in the one clip if a reproduction of the first play list is instructed, and reproducing the AV stream data of the first portion and the second portion in the one clip if a reproduction of the second play list is instructed; and deleting the AV stream data of the first portion and the second portion in the one clip indicated in the second play list from the recording medium if a deletion of the second play list is instructed.

2. A method according to claim 1, further comprising:
displaying a warning, if the deletion of the second play list is instructed.

3. A method according to claim 1, further comprising:
if a restoration instruction of the first portion is provided, changing the first play list to designate the AV stream data other than the second portion of the one clip, and changing the second play list to indicate the second portion in the one clip.

4. An image processing apparatus comprising:
an operation unit that is operable by a user; and
at least one controller coupled via a bus to a memory, wherein based on instructions from the operation unit, the controller controls one or more of:
a recording unit that records a clip of moving image data and a first play list designating the moving image data in one clip on a recording medium;
a designating unit that designates a first portion and a second portion different from the first portion in the one clip recorded on the recording medium in accordance with an operation by the operation unit;
a play list processing unit that generates a second play list indicating the first portion and the second portion in the one clip designated by the designating unit, the play list processing unit changing the first play list so as to designate the moving image data other than the first portion and the second portion in the one clip;
a reproducing unit that reproduces the clip of the moving image data from the recording medium;
a control unit that controls the reproducing unit, the control unit controlling the reproducing unit to reproduce the moving image data other than the first portion and the second portion in the one clip if a reproduction of the first play list is instructed by the operation unit, and to reproduce the moving image data of the first portion and the second portion in the one clip if a reproduction of the second play list is instructed by the operation unit; and
a deletion unit that deletes the moving image data of the first portion and the second portion in the one clip indicated in the second play list from the recording medium if an instruction for deleting the second play list is issued by the operation unit.

5. An apparatus according to claim 4, wherein the play list processing unit generates a plurality of second play lists each corresponding to the clips of the moving image data.

6. An apparatus according to claim 4, wherein the play list processing unit changes the first play list to designate the moving data other than the second portion of the one clip and changes the second play list to indicate the second portion in the one clip if a restoration of the first portion is instructed by the operation unit.

7. An apparatus according to claim 4, wherein the control unit prohibits the recording unit from recording new moving image data in recording regions where the moving image data of the first portion and the second portion indicated by the second play list are recorded.

* * * * *